(12) United States Patent
Kleinerman

(10) Patent No.: US 11,381,267 B1
(45) Date of Patent: Jul. 5, 2022

(54) SYSTEM, APPARATUS AND METHOD FOR CANCELLING TONAL INTERFERENCE IN AN ORTHOGONAL FREQUENCY DIVISION MULTIPLEXING (OFDM) RECEIVER

(71) Applicant: Silicon Laboratories Inc., Austin, TX (US)

(72) Inventor: Alexander Kleinerman, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/122,042

(22) Filed: Dec. 15, 2020

(51) Int. Cl.
| | | |
|---|---|---|
| *H04B 1/12* | (2006.01) | |
| *H04B 1/16* | (2006.01) | |
| *H04L 5/00* | (2006.01) | |
| *H04B 1/10* | (2006.01) | |
| *H04L 27/26* | (2006.01) | |

(52) U.S. Cl.
CPC ............ *H04B 1/12* (2013.01); *H04B 1/1027* (2013.01); *H04B 1/16* (2013.01); *H04L 5/001* (2013.01); *H04L 27/26524* (2021.01)

(58) Field of Classification Search
CPC .......... H04B 1/12; H04B 1/1027; H04B 1/16; H04L 5/001; H04L 27/26524
See application file for complete search history.

(56) References Cited

U.S. PATENT DOCUMENTS

| | | | |
|---|---|---|---|
| 9,742,611 B2 | 8/2017 | Elenes | |
| 2008/0118012 A1* | 5/2008 | Corke | .................. H04L 27/2647 375/348 |
| 2013/0102254 A1* | 4/2013 | Cyzs | ....................... H04B 1/525 455/63.1 |
| 2016/0277050 A1* | 9/2016 | Kato | ....................... H04B 7/08 |
| 2017/0366210 A1* | 12/2017 | Pande | ............... H04L 25/03821 |
| 2018/0175906 A1* | 6/2018 | Jiang | .................... H04J 11/0063 |

OTHER PUBLICATIONS

Mathworks.com, "Channel Estimation—MATLAB & Simulink," Oct. 10, 2020, 8 pages total.
Berkley.edu, "E225C—Lecture 16, OFDM Introduction," Date Unknown, 15 pages total.
U.S. Appl. No. 17/104,054, filed Nov. 25, 2020, entitled, "System and Method for Efficient Timing Estimation and Tracking in an Orthogonal Frequency Division Multiplexing (OFDM) Communication System," by Alexander Kleinerman.
U.S. Appl. No. 17/104,063, filed Nov. 25, 2020, entitled, "System and Method for Detecting of Channel Conditions and Channel Estimation in an Orthogonal Frequency Division Multiplexing (OFDM) Receiver," by Alexander Kleinerman.

* cited by examiner

*Primary Examiner* — Dac V Ha
(74) *Attorney, Agent, or Firm* — Trop, Pruner & Hu, P.C.

(57) ABSTRACT

In one aspect, an apparatus includes: a fast Fourier transform (FFT) engine to receive orthogonal frequency division multiplexing (OFDM) samples of one or more OFDM symbols and convert the one or more OFDM samples into a plurality of frequency domain carriers; and a tone cancellation circuit coupled to the FFT engine to receive the one or more OFDM samples and generate a plurality of frequency carriers for the one or more OFDM samples, identify a highest magnitude frequency carrier of the plurality of frequency carriers, and remove tone interference from the OFDM samples based at least in part on the highest magnitude frequency carrier.

20 Claims, 7 Drawing Sheets

SYSTEM, APPARATUS AND METHOD FOR CANCELLING TONAL INTERFERENCE IN AN ORTHOGONAL FREQUENCY DIVISION MULTIPLEXING (OFDM) RECEIVER

BACKGROUND

Radio receivers are omnipresent in modern technology. In addition to standalone radios for receipt of broadcast radio signals, all manners of tech and non-tech devices include some type of radio receiver (and often paired with a transmitter). Such modem circuitry is present in any device having wireless capabilities. While some broadcast radio signals are transmitted with analog coding (e.g., conventional AM and FM signals), other terrestrial and satellite wireless communication systems use some type of digital encoding. Some example digital radio systems include National Radio System Committee (NRSC-5C, also known as HD™ radio), Digital Audio Broadcasting (DAB), Digital Radio Mondiale (DRM) or other standard.

In certain of these communication systems different noise and interference sources may be present. In certain systems, a tone interference may exist as a result of co-channel interference. While in the time domain such interference may not be especially great, in the frequency domain this interface can manifest as large magnitude frequency bins. One common technique to reduce this tone interference is to zero out one or more interference tones and tones affected by these tones. However, this leads to losses in fidelity.

SUMMARY OF THE INVENTION

In one aspect, an apparatus includes: a buffer to store orthogonal frequency division multiplexing (OFDM) samples of one or more OFDM symbols; a fast Fourier transform (FFT) engine coupled to the buffer, the FFT engine to receive the one or more OFDM samples from the buffer and convert each of the one or more OFDM samples into a plurality of frequency domain carriers; and a tone cancellation circuit coupled to the FFT engine to receive the one or more OFDM samples and generate a plurality of frequency carriers for each of the OFDM samples, identify a highest magnitude frequency carrier of the plurality of frequency carriers, and remove tone interference from the one or more OFDM samples based at least in part on the highest magnitude frequency carrier.

In an example, the tone cancellation circuit is to replace the highest magnitude frequency carrier with a modified frequency carrier according to $-(P-1)Y(n)$, where $P=M+R/N$ is an oversampling factor and $Y(n)$ is the highest magnitude frequency carrier. The tone cancellation circuit may pad the one or more OFDM samples with $(M-1)N+R$ zeros and generate $M\times N+R$ frequency carriers using the padded OFDM samples, where N is a segment length of an OFDM symbol and R is an arbitrary number, and M is a resolution factor. The tone cancellation circuit may identify the highest magnitude frequency carrier from the $M\times N+R$ frequency carriers, remove the tone interference, and transform the $M\times N+R$ frequency carriers to a plurality of tone canceled time domain samples and thereafter remove tail samples of the plurality of tone canceled time domain samples. The tone cancellation circuit may include the FFT engine, and further include an inverse FFT engine to transform the $M\times N+R$ frequency carriers to the plurality of tone canceled time domain samples. The apparatus may further include a second FFT engine to receive the plurality of tone canceled time domain samples and convert the one or more OFDM samples into a second plurality of frequency carriers. The apparatus may further include a demodulator to demodulate the second plurality of frequency carriers.

In another example, the tone cancellation circuit may identify a plurality of neighboring frequency carriers to the highest magnitude frequency carrier. The tone cancellation circuit may further generate additional frequency carriers between the highest magnitude frequency carrier and a first neighboring frequency carrier of the plurality of neighboring frequency carriers. The tone cancellation circuit may determine a highest magnitude frequency carrier of the additional frequency carriers. The tone cancellation circuit may cancel the tone interference from the plurality of time domain samples according to: $x(k)=x(k)-ae^{-i2\pi f_m k}$, for $0 \leq k < N$, where $x(k)$ is a time domain sample, a is a weighting coefficient and $f_m$ is a frequency of the highest magnitude frequency carrier of the additional frequency carriers.

In yet another aspect, a method includes: identifying, in a tone cancellation circuit of a receiver, from a plurality of frequency carriers of an OFDM symbol, a highest magnitude frequency carrier and first and second neighboring frequency carriers to the highest magnitude frequency carrier; iteratively calculating, in the tone cancellation circuit, a plurality of intermediate frequency carriers between the highest magnitude frequency carrier and a selected one of the first and second neighboring frequency carriers, and identifying a frequency value of a highest magnitude frequency carrier of the plurality of intermediate frequency carriers; and cancelling, in the tone cancellation circuit, a tone in the OFDM symbol based at least in part on the frequency value of the highest magnitude frequency carrier of the plurality of intermediate frequency carriers.

In an example, the method further comprises canceling the tone in the OFDM symbol in the time domain. The tone in the OFDM symbol may be cancelled according to: $x(k)=x(k)-ae^{-i2\pi f_m k}$, for $0 \leq k < N$, where $x(k)$ is a time domain sample, a is a weighting coefficient, $f_m$ is the frequency value of the highest magnitude frequency carrier of the plurality of intermediate frequency carriers, and N is a segment length of the OFDM symbol. The method may further include identifying a higher magnitude frequency carrier of the first and second neighboring frequency carriers and selecting the higher magnitude frequency carrier as the selected one of the first and second neighboring frequency carriers. The method also may include controlling a timing of one or more OFDM symbols based at least in part on the tone canceled OFDM symbol. Controlling the timing may include at least one of controlling a timing of a buffer and adjusting a sampling clock signal used to sample the one or more OFDM symbols.

In an example, the method may further include, for a second OFDM symbol: identifying a highest magnitude frequency carrier of the second OFDM symbol; and in response to determining that the highest magnitude frequency carrier of the second OFDM symbol does not exceed a threshold level, passing the second OFDM symbol without cancelling a tone in the second OFDM symbol.

In yet another aspect, an apparatus may include: means for identifying a highest magnitude frequency carrier and first and second neighboring frequency carriers to the highest magnitude frequency carrier of an OFDM symbol; means for calculating a plurality of intermediate frequency carriers between the highest magnitude frequency carrier and a selected one of the first and second neighboring frequency carriers; and means for cancelling a tone in the OFDM symbol based at least in part on a frequency value of a highest magnitude frequency carrier of the plurality of intermediate frequency carriers. In an example, the apparatus may include means for canceling the tone in the OFDM symbol in the time domain according to: $x(k)=x(k)-ae^{-i2\pi f_m k}$, f or $0 \le k < N$, where $x(k)$ is a time domain sample, a is a weighting coefficient, $f_m$ is the frequency value of the highest magnitude frequency carrier of the plurality of intermediate frequency carriers, and N is a segment length of the OFDM symbol.

DETAILED DESCRIPTION

In various embodiments, a radio receiver is implemented with a tone cancellation circuit that is configured to efficiently reduce or remove tonal interference in an incoming radio frequency (RF) signal. More specifically, embodiments may leverage one of multiple different techniques to remove this interference, which depending on the implementation, may occur in the time domain or the frequency domain. Embodiments may be used in a variety of receiver implementations for use in identifying and removing tone interference, particularly for incoming orthogonal frequency division multiplexing (OFDM) communications. While embodiments are not limited in this regard, implementations may be used in connection with a Digital Radio Mondiale (DRM) digital radio communication system in accordance with a given DRM specification. Other implementations can be used in connection with other digital communication techniques, including digital TV (e.g., one or more Digital Video Broadcasting (DVB) standards), Integrated Digital Services Broadcasting (IDSB), cellular techniques such as Long Term Extension (LTE) and 5G, or other receivers using OFDM signaling.

Figure 1A:
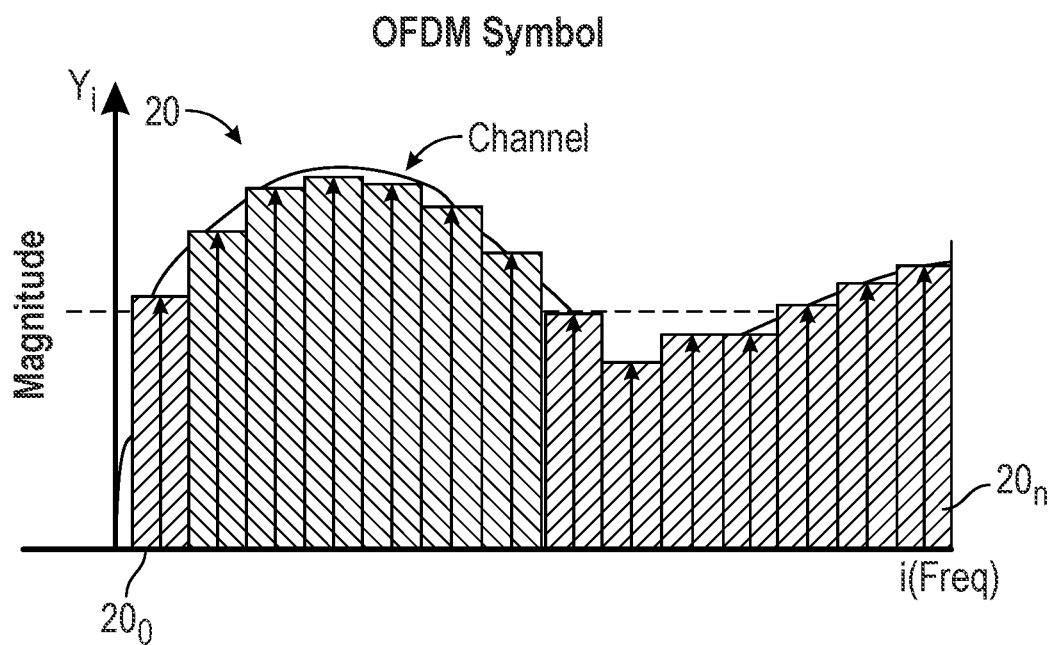
FIG. 1A is a graphical illustration of a received signal.

Referring now to FIG. 1A, shown is a graphical illustration of a signal received in a receiver via a channel. As shown in FIG. 1A, an OFDM symbol 20, after conversion to the frequency domain, includes a plurality of frequency carriers $20_0$-$20_n$. Given a channel having some level of impairment, frequency carriers 20 have different magnitudes. An OFDM signal is processed mostly in the frequency domain.

Due to the properties of OFDM modulation in which message information includes a cyclic prefix and message content, each signal can be presented as:

$$Y_i = X_i H_i + N_i \qquad \text{[Equation 1]}$$

where:

$Y_i$ is the complex value of an input signal at frequency i, $H_i$ is the complex value of the channel at frequency i, $X_i$ is the complex value of the transmitted modulation symbol i, and $N_i$ is the complex gaussian noise sample.

Figure 1B:
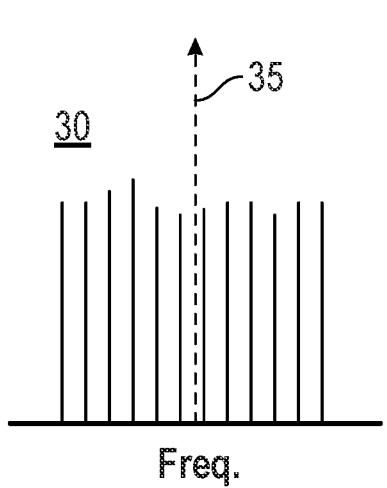
FIG. 1B is a graphical illustration of a frequency spectrum of an OFDM signal having tonal interference.

In embodiments tone interference may be detected in the frequency domain by using a Fourier transform. At a high level, tone interference can be identified based on an absolute value of a frequency spectrum, and more particularly by identifying the highest value in this spectrum. Referring now to FIG. 1B, shown is a graphical illustration of a frequency spectrum of an OFDM signal having tonal interference. More specifically as shown in FIG. 1B, graphical illustration 30 shows a frequency spectrum having a plurality of frequency carriers after transformation of an incoming OFDM symbol (or portion thereof) to the frequency domain. Note that the terms "frequency bin," "bin," "frequency carrier," and "carrier" may be used interchangeably herein to refer to a frequency domain sub-carrier representing a sample of one frequency of a frequency spectrum of a symbol that is comprised of multiple samples in the time domain. As seen, in FIG. 1B an interfering tone 35 is present. Further as shown, this tone 35, which has a much larger magnitude than the other frequency carriers, may fall in between two frequency carriers, thus presenting as two high tones, as shown in FIG. 1C, which is another graphical illustration of a frequency spectrum of an OFDM signal having tonal interference.

Note that in at least some embodiments a highest value carrier can be compared to an average power of the frequency carriers or to the power of the signal in the time domain. From this analysis, it can be determined whether the tone needs to be canceled. If the value of the highest bin is approximately on the same level as other bins, it may be determined that the highest value does not represent the interfering tone and is just part of the main signal, in which the tone is not canceled. In different applications there can be different thresholds for enabling tone canceling for a given symbol.

Figure 1C:
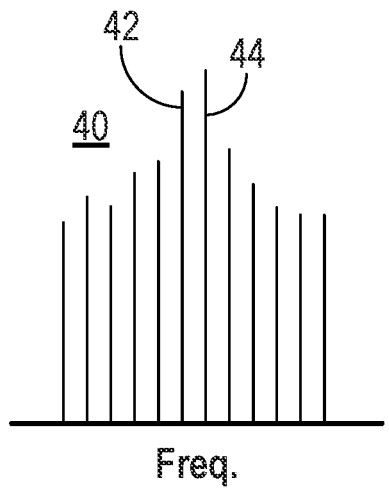
FIG. 1C is another graphical illustration of a frequency spectrum of an OFDM signal having tonal interference.

As seen in FIG. 1C, graphical illustration 40 shows the result of tonal interference that presents as two high tones 42, 44. As such, an interfering tone (such as tone 35 in FIG. 1B) can be seen as a sinc function (sin(x)/x) that is sampled at the points of FFT frequencies. As a result, interference from the tone is spread over multiple neighboring FFT tones.

In one embodiment, more accurate tone cancellation may be realized by increasing resolution of a given signal segment under analysis prior to identifying an interfering tone in the frequency domain. Once this interfering tone is identified, certain compensation or filtering can be performed to remove or at least reduce the effects of this interfering tone. The resulting tone canceled frequency domain signal segment can then be transformed back to the time domain for further processing. Understand that during such processing there may be an additional transformation back to the frequency domain for further frequency domain processing, including demodulation.

In another embodiment, an iterative process may be performed in the frequency domain to identify the exact location of an interfering tone, which as discussed above, may fall between frequency bins. This process may proceed through multiple iterations with finer-grained resolutions to identify a frequency bin having a greatest magnitude. In turn, based on the identified highest magnitude frequency bin, tone cancellation may be performed in the time domain. Details of these different embodiments are discussed further below.

Figure 2:
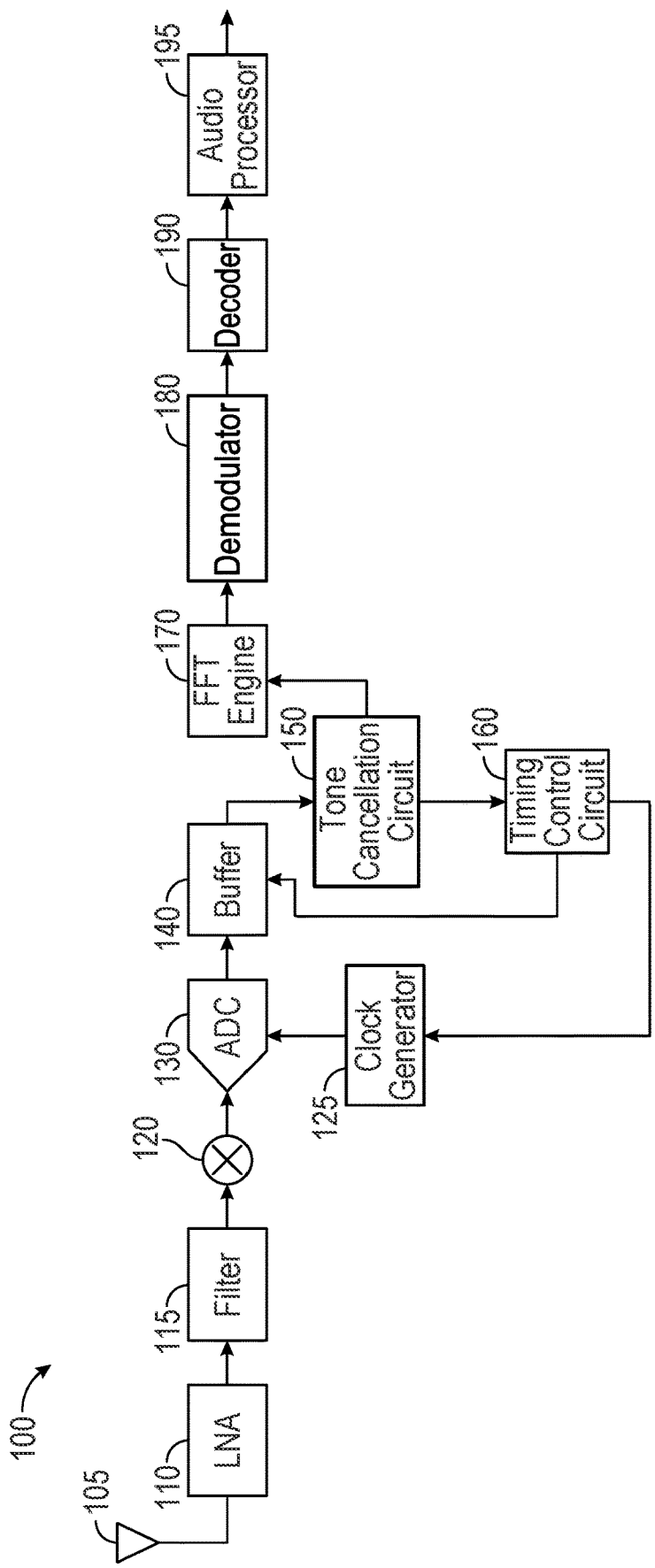
FIG. 2 is a block diagram of a receiver in accordance with an embodiment.

Referring now to FIG. 2, shown is a block diagram of a receiver in accordance with an embodiment. As shown in FIG. 2, receiver 100 may include a signal processing path having various components. Embodiments can be incorporated in different types of receiver systems. In some embodiments, receiver 100 may be a single-die integrated circuit such as a CMOS die having mixed signal circuitry including both analog and digital circuitry.

With reference to receiver 100, an incoming RF signal that includes digital radio signals according to a given digital broadcast specification may be received over the air via an antenna 105. As used herein, the terms "digital radio" or "digital radio broadcast signal" are used interchangeably and are intended to correspond to broadcast radio communication that occurs digitally. Such communications may be in accordance with various standards such as a HD™ radio, DAB, DRM or other standard and/or combinations thereof.

As shown in FIG. 2, an incoming radio frequency (RF) signal received via antenna 105 is provided to a low noise amplifier (LNA) 110, which amplifies the RF signal. In turn, LNA 110 is coupled to a filter 115, which may perform filtering of the received RF signal. Understand while shown with two RF front end blocks, a receiver may include additional RF front end circuitry in other examples. In turn, the filtered RF signal is provided to a mixer 120, which in an embodiment may be implemented as a complex mixer. In embodiments herein mixer 120 may downconvert the RF signal to a lower frequency signal using a mixing signal (not shown in FIG. 2). In a particular embodiment, this lower frequency signal may be, e.g., a low-intermediate frequency (IF) or zero-IF signal. This downconverted signal is an in-phase/quadrature phase (IQ) signal.

The resulting downconverted signal is provided to an analog-to-digital converter (ADC) 130, where the signal can be digitized into a digital signal at a sampling rate according to a clock signal received from a clock generator 125. In an embodiment, clock generator 125 may be implemented as a local oscillator, phase lock loop or other such clock generation circuit. In an embodiment in which the sampling clock signal and mixing signal are at the same frequency, clock generator 125 also may provide the mixing signal to mixer 120. Note that in some embodiments, either before or after digitization, channelization may be performed to generate a channelized signal. In an OFDM system, a plurality of samples forms an OFDM symbol of an incoming data stream.

In turn, samples are provided to a buffer 140, which may be implemented as a first in first out (FIFO) 140. The incoming samples are stored in buffer 140. The incoming time domain OFDM symbols stored in buffer 140 are provided to a tone cancellation circuit 150. In embodiments herein, tone cancellation circuit 150 may be configured to identify and remove tone interference. After the samples are tone canceled, they are output to a main digital signal processing path including a fast Fourier transform (FFT) engine 170, which generates frequency domain OFDM symbols from incoming time domain OFDM symbols. In one embodiment, each incoming time domain OFDM symbol can be processed by FFT engine 170 into a plurality of frequency carriers. Note that the number of frequency carriers corresponding to a given OFDM symbol may vary depending upon bandwidth of signal and a time duration of the OFDM symbol (without a cyclic prefix). While a single FFT engine is shown as part of a main signal processing path, an additional FFT engine may be present in tone cancellation circuit 150, as described in more detail below. In such implementations, additionally an inverse FFT engine also may be present to transform frequency domain information back to the time domain prior to being provided to FFT engine 150.

As further shown, after tone cancellation, tone canceled time domain OFDM symbols from tone cancellation circuit 150 also may be provided to a timing control circuit 160. In embodiments herein, timing control circuit 160 may be configured to perform timing estimation to determine a synchronization of the OFDM symbols. In this way, the symbols can be provided to downstream digital processing circuitry in correct synchronization. While embodiments may vary, in examples herein, timing control circuit 160 may determine a timing estimate and provide control signals to buffer 140 and/or clock generator 125 to control timing. As such, timing control circuit 160 acts as a feedback circuit to control timing based on the OFDM symbols themselves.

With continuing reference to the main signal processing path, the frequency carrier outputs from FFT engine 170 form a frequency domain symbol that in turn is provided to a demodulator 180, which may demodulate the incoming carriers and provide demodulated carriers. In an embodiment, demodulator 180 may be a sub-symbol decoder to produce a soft bit per carrier. In turn, the demodulated carriers may be provided to a decoder 190, where error correction and information bit extraction is performed. In turn, the resulting demodulated signal may be provided to an audio processor 195 for audio processing. The encoded audio signal is then provided to an audio source decoder (not shown for ease of illustration in FIG. 2) to generate source audio. In the case of a data link, information bits may be provided to a data processor. Although shown as individual components, understand that portions of the receiver after ADC 130 to the end of the signal processing path of FIG. 2 can be implemented in a digital signal processor (DSP).

While described with this particular embodiment in FIG. 2, other implementations are possible, and additional circuitry can be present. In addition, a tone cancellation circuit may be configured in other types of hardware, may be realized via combinations of hardware, firmware, and/or software, and also may be implemented within a microcontroller or DSP.

Figure 3A:
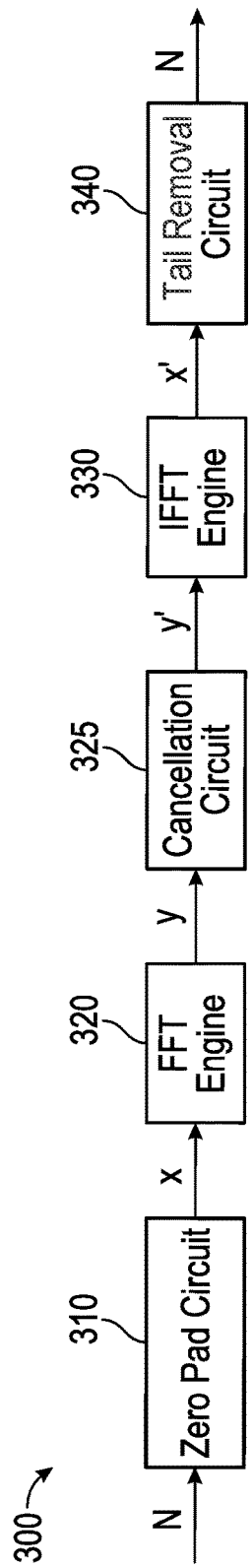
FIG. 3A is a block diagram of a tone cancellation circuit in accordance with a first embodiment.

Referring to FIG. 3A, shown is a block diagram of a tone cancellation circuit in accordance with a first embodiment. In an embodiment, tone cancellation circuit 300 is one example implementation that may be incorporated in a receiver such as receiver 100 of FIG. 2 (more specifically as tone cancellation circuit 150).

As shown in FIG. 3A, tone cancellation circuit 300 includes a zero pad circuit 310. In an embodiment, pad circuit 310 receives an incoming time domain signal segment of length N and passes it with some additional number of zeros to increase an oversampling factor. In an implementation in which it is desired to increase resolution by a factor of M for a signal segment of length N, zero pad circuit 310 may add (M−1)N zeros. As such, zero pad circuit 310 provides a time domain signal x that is zero padded and provided to an FFT engine 320, which may transform this time domain signal into the frequency domain as a frequency spectrum having M×N samples (y(n)).

Still with reference to FIG. 3A, these frequency carriers are provided to a cancellation circuit 325. In the embodiment of FIG. 3A, cancellation circuit 325 may identify a highest magnitude frequency carrier and then cancel the tone that this frequency carrier represents by replacing this highest bin value with its negative value multiplied by M−1. As such, for this highest bin value, the resulting frequency carrier is transformed into −(M−1)y(n), where y(n) is the highest bin value. Thus a modified frequency spectrum y' is output from cancellation circuit 325 and is provided to an inverse fast Fourier transform (IFFT) engine 330, which transforms the frequency spectrum back to the time domain as X'. In turn, this frequency domain signal segment is provided to a tail removal circuit 340 where the zero padded portion, namely (M−1)N tail samples, may be discarded. As such, the output of tone cancellation circuit 300 is a tone canceled signal (x) in the time domain, which is provided for further processing. Note in other cases, it may be determined that the maximum is not high enough as compared to the rest of the bins such that the tone is not cancelled.

In another implementation, an iterative process may be performed to identify the tone. Here a FFT is taken on the input signal segment without zero padding. Then the highest bins of the FFT are identified. From these it is determined which bin near the highest is higher. For example, if Y(n) is the highest, check between Y(n+1) and Y(n−1) for the next highest bin. Assume the higher of these bins is Y(n+1). That means the interfering tone is between bins Y(n+1) and Y(n). From FFT, it is known that:

$$Y(n) = \sum_{k=0}^{N-1} x_k e^{-i2\pi kn/N} = \sum_{k=0}^{N-1} x_k e^{-i2\pi f_n k} \qquad \text{[Equation 2]}$$

and:

$$Y(n+1) = \sum_{k=0}^{N-1} x_k e^{-i2\pi f_{n+1} k} \qquad \text{[Equation 3]}$$

To calculate the bin value at this midpoint, Equation 4 is used:

$$Y\left(\frac{(f_n + f_{n+1})}{2}\right) = \sum_{k=0}^{N-1} x_k e^{-i2\pi (f_n + f_{n+1}) k/2} \qquad \text{[Equation 4]}$$

Figure 3B:
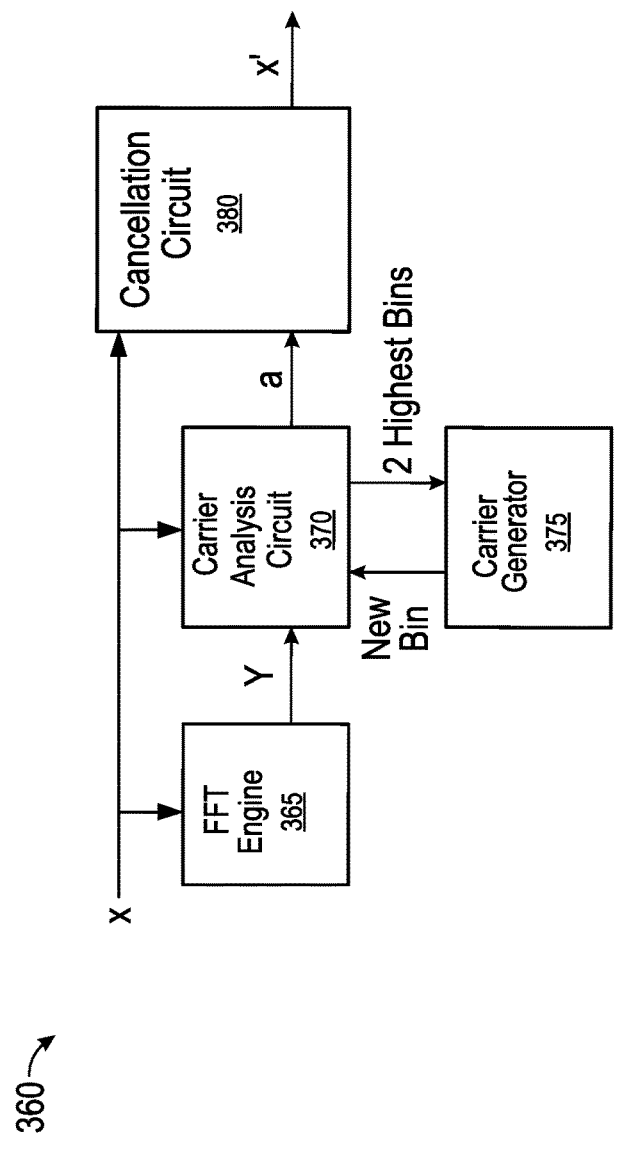
FIG. 3B is a block diagram of a tone cancellation circuit in accordance with a second embodiment.

In another embodiment, a tone cancellation circuit may take the form shown in FIG. 3B. Illustrated in FIG. 3B is a block diagram of a tone cancellation circuit in accordance with a second embodiment. In an embodiment, tone cancellation circuit 360 is another example implementation that may be incorporated in a receiver such as receiver 100 of FIG. 2 (more specifically as tone cancellation circuit 150).

As shown, an incoming time domain signal X is provided to an FFT engine 365, which may transform this time domain signal into the frequency domain as a frequency spectrum Y. In turn, the frequency carriers are provided to a carrier analysis circuit 370. In embodiments herein, carrier analysis circuit 370 may be configured to identify the highest magnitude bins within the frequency carriers. In an embodiment, carrier analysis circuit 370 may identify a highest magnitude frequency bin and its two neighboring bins. In turn, from these 3 frequency bins the two highest bins are identified and provided to a carrier generator 375, which may be configured to generate another frequency carrier in between these two highest bins.

In turn, carrier generator 375 may provide this new bin back to carrier analysis circuit 370, which may iteratively identify the two highest bins of the resulting three bins in an iterative process with carrier generator 375. This iterative process may run some predetermined number of times to result in identification of a highest frequency bin within these multiple generated frequency bins and the original frequency bins. In turn, carrier analysis circuit 370 may provide information regarding the highest magnitude frequency bin along and a weighting coefficient a to a cancellation circuit 380, which may cancel the interfering tone in the time domain using this additional information regarding the highest magnitude frequency bin and the original time domain signal x. In an embodiment, cancellation circuit 380 may remove tone interference according to Equations 5 and 6. Again note that if it is determined that the maximum is not high enough as compared to the rest of the bins, tone cancellation may not be performed.

Equation 5 is as follows:

$$a = 1/N \sum_{k=0}^{N-1} x_k e^{-i2\pi f_m k}, \qquad \text{[Equation 5]}$$

where a is a weighting coefficient, and $f_m$ is the frequency of the highest bin value of the intermediate frequency bins between the two identified highest bins of the frequency spectrum. In turn, Equation 6 is as follows:

$$x(k) = x(k) - a e^{-i2\pi f_m k}, \text{ for } 0 \leq k < N. \qquad \text{[Equation 6]}$$

As such, cancellation circuit 380 outputs a tone-canceled time domain signal X'. Understand while shown at this high level in the embodiment of FIG. 3B, variations and alternatives are possible.

Figure 4:
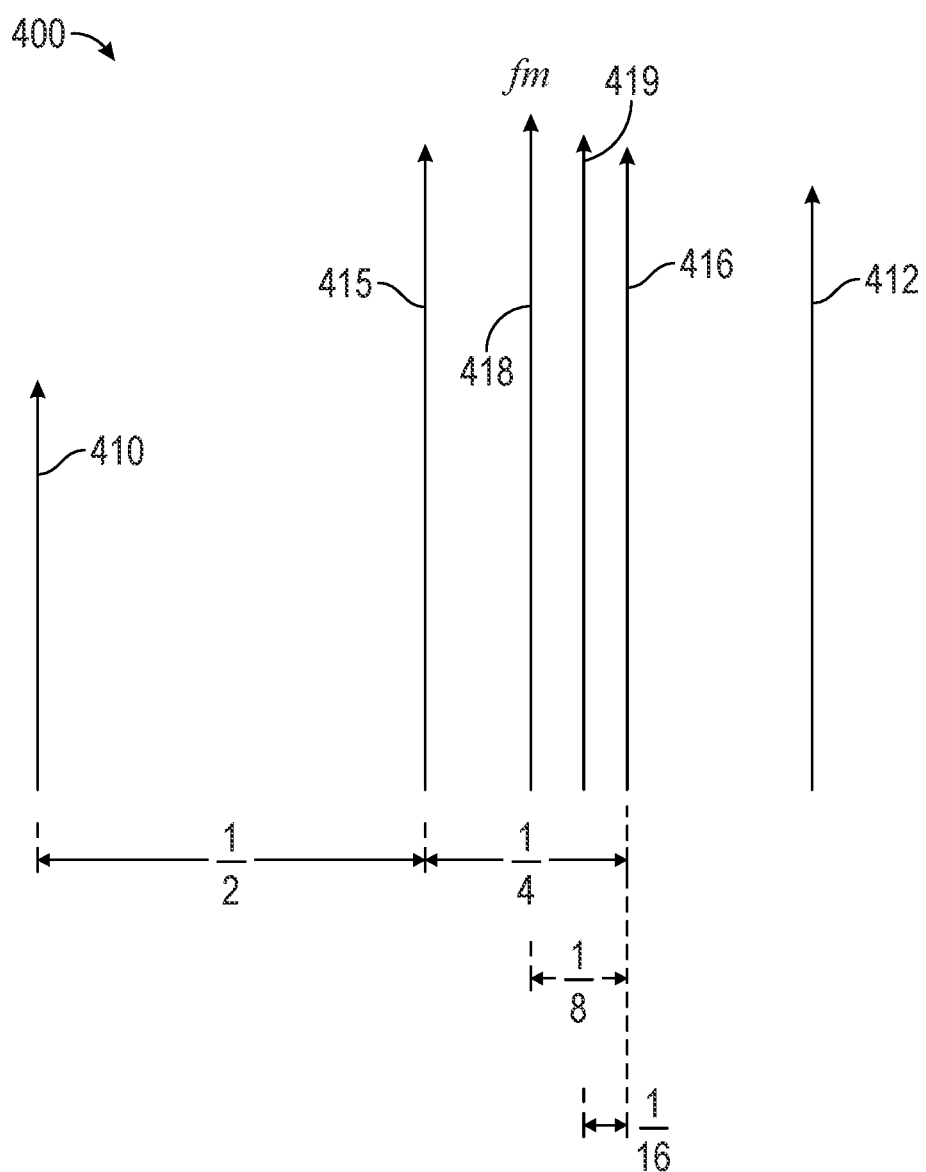
FIG. 4 is a graphical illustration of a tone cancellation process

Referring now to FIG. 4, shown is a graphical illustration of a tone cancellation process, which may be executed in an implementation such as tone cancellation circuit 360. As illustrated here, assume that within a frequency spectrum under analysis, the two highest magnitude frequency carriers are identified as carriers 410, 412. Next, the magnitude of a bin in the middle of these 2 highest bins is calculated, which is a new frequency carrier 415 at a frequency halfway between the frequencies of carriers 410 and 412.

As seen, multiple iterations may occur with a next generated frequency carrier 416 that is generated halfway between frequency carriers 415 and 412. An additional generated frequency carrier 418, halfway between frequency carriers 415 and 416 is generated, and finally a yet additional frequency carrier 419, halfway between frequency carriers 416, 418, is generated. As seen, from all of these frequency carriers, frequency carrier 418 (fm) is the highest magnitude bin and is used further in removing tone interference of this highest magnitude carrier.

Figure 5:
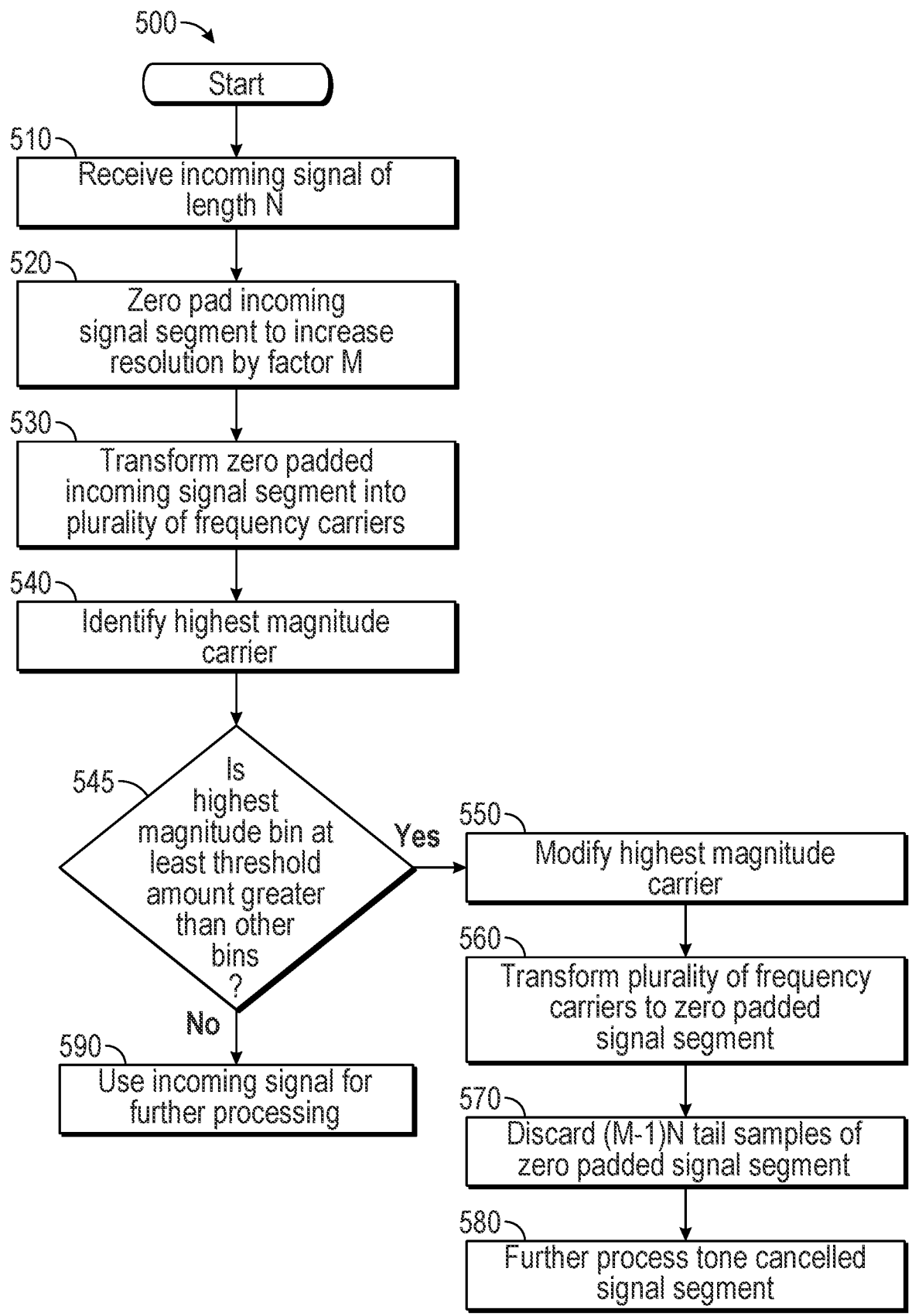
FIG. 5 is a flow diagram of a method in accordance with an embodiment.

Referring now to FIG. 5, shown is a flow diagram of a method in accordance with an embodiment. More specifically, method 500 is a method for removing tone interference according to a first embodiment, implementing zero padding. In an embodiment, method 500 may be performed by a tone cancellation circuit such as the various hardware circuits described above, alone or in connection with firmware and/or software.

As illustrated, method 500 begins by receiving an incoming signal of length N (block 510). This incoming signal is received in the time domain. Next at block 520 the signal segment is zero padded to increase its resolution or oversampling factor by a factor of M (block 520). Then the zero padded incoming signal segment is transformed into the frequency domain to result in a plurality of frequency carriers (block 530). Next at block 540 a highest magnitude carrier can be identified.

Next it may be determined at diamond 545 whether the highest magnitude carrier is sufficiently greater than the other bins. Thus here it may be determined whether this highest magnitude carrier is at least a threshold amount greater than the other carriers. If not, no tone cancellation is needed and control passes to block 590, where the input signal is just copied to the output of the tone cancellation circuit and is used for further processing.

Instead if it is determined that the highest magnitude carrier exceeds the threshold variation, control passes to block 550, where this highest magnitude carrier can be modified. In an embodiment, the modification may be realized by replacing this highest bin by its negative value multiplied by M−1.

Still with reference to FIG. 5, after this modification at block 560 the resulting plurality of frequency carriers can be transformed back to the time domain, resulting in a zero padded signal segment that has a greater number of samples than the original incoming signal. As such, at block 570 a given number of tail samples may be discarded. More specifically, N(M−1) tail samples may be discarded to result in the same original segment size of length N. Then at block 580 the tone canceled signal segment may be further processed. For example, this tone canceled signal segment may be provided to a timing estimation circuit to perform timing estimation. In addition, the tone canceled signal segment can be provided to further downstream circuitry for further processing, including an additional transformation to the frequency domain for performing demodulation and other processing. Understand while shown at this high level in the embodiment of FIG. 5, many variations and alternatives are possible.

Figure 6:
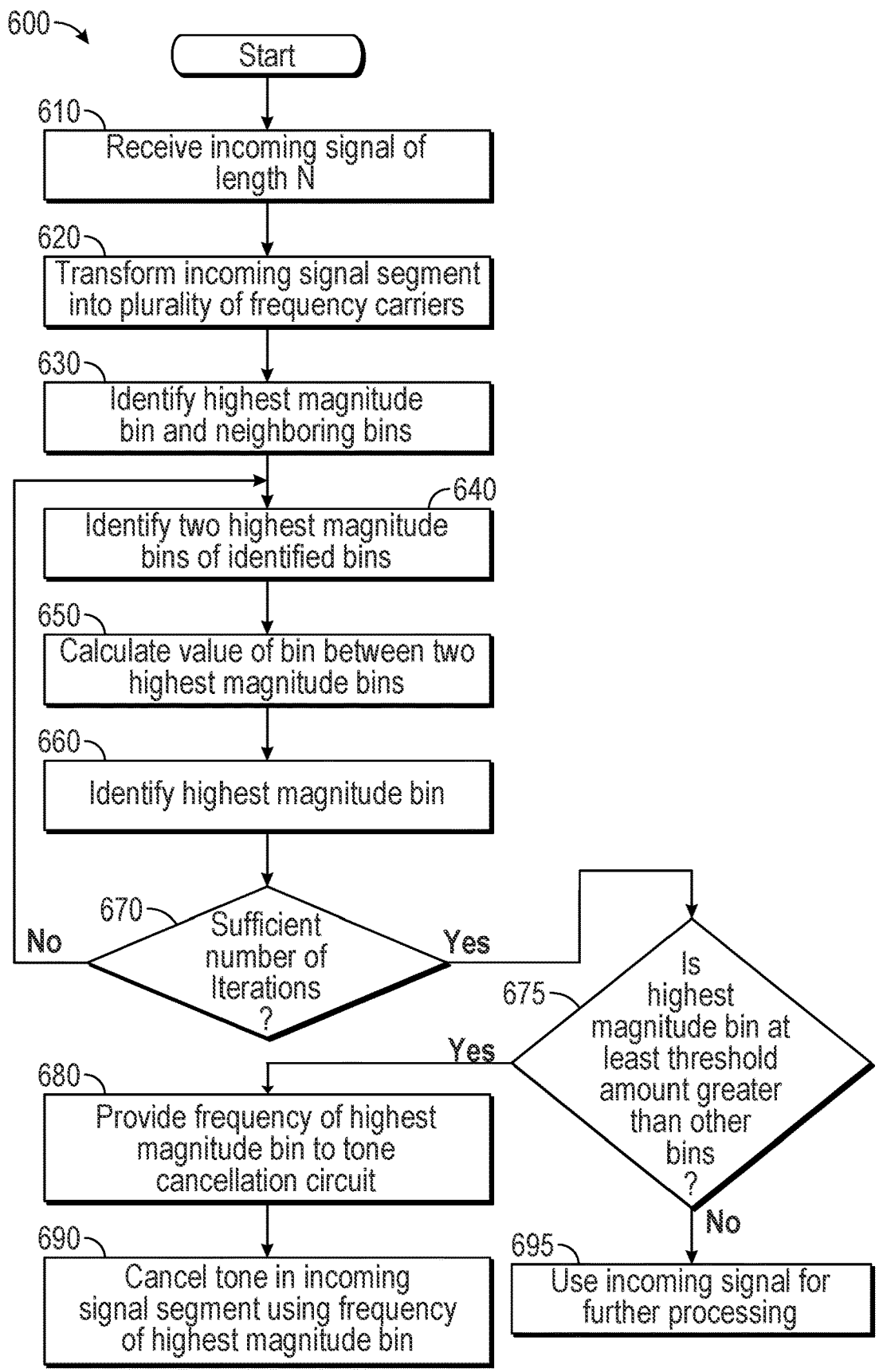
FIG. 6 is a flow diagram of a method in accordance with another embodiment.

Referring now to FIG. 6, shown is a flow diagram of a method in accordance with another embodiment. More specifically, method 600 is a method for removing tone interference according to a second embodiment, based on an iterative process. In an embodiment, method 600 may be performed by a tone cancellation circuit such as the various hardware circuits described above, alone or in connection with firmware and/or software.

As illustrated, method 600 begins by receiving an incoming signal of length N in the time domain (block 610). This incoming signal is received in the time domain. Next at block 620 the signal segment is transformed into the frequency domain to result in a plurality of frequency carriers. Next at block 630 a highest magnitude bin value and its two neighboring bins can be identified.

Still with reference to FIG. 6 at block 640, of the highest bin value and its two neighboring bin values, the two highest magnitude bins can be identified. Thereafter at block 650 a new bin value may be calculated, namely the value of a frequency carrier between these two highest magnitude bins. From the resulting three bins, the highest magnitude bin can be identified at block 660.

Still with reference to FIG. 6, next at diamond 670 it is determined whether a sufficient number of iterations of this process has occurred. Although embodiments are not limited in this regard, as an example, a threshold of three such iterations may be used in an embodiment. In a DRM 3 or 4 iteration may occur. In general, more iterations may lead to better results, with a tradeoff between complexity and performance. Also with every additional iteration, the additional improvement is smaller and smaller until after a certain number of iterations the improvement is negligible. Understand that in different implementations a different number of iterations may occur, and this value may be a programmable value. When it is determined that the given number of iterations has occurred, control passes to diamond 675 to determine whether the highest magnitude carrier is sufficiently greater than the other bins. If not, no tone cancellation is needed and control passes to block 695, where the input signal is just copied to the output of the tone cancellation circuit and is used for further processing.

Instead if it is determined that the highest magnitude carrier exceeds the threshold variation, control passes to block 680 where the frequency of this highest magnitude bin may be provided to a tone cancellation circuit. Finally, at block 690 the tone may be canceled in the time domain using the frequency of the highest magnitude bin. In an embodiment, this tone cancellation process may be performed in accordance with Equations 5 and 6. Although shown at this high level in the embodiment of FIG. 6, many variations and alternatives are possible.

As one example of other variations, the implementations of FIGS. 5 and 6 can be modified. For example, embodiments may be tailored to an FFT engine that operates with powers of two, i.e., with $N=2^k$. For the implementation in accordance with FIG. 5, operation is the same, but zero padding is performed to a power of two value. So instead of zero padding to N×M by adding (M−1)N zeros, zero padding occurs with (M−1)N+R zeros so that $N'=M \times N+R=2^k$ (the smallest R possible for which the equation works may be used), where R is a given (arbitrary) number of added zeros. Operation proceeds as discussed above in FIG. 5, except that the −(M−1)y(n) value becomes −(N'/N−1)y(n), and instead of discarding (M−1)N tail samples, (M−1)N+R samples are discarded. Note that this equation may replace (M−1)N more generally, such that when R equals zero the equations are the same. For the implementation in FIG. 6, the input signal is zero padded with R zeros so that the total number of samples becomes N'=N+R, where N' is equal to a $2^k$ with $2^{(k-1)}<N<2^k$ (of course zero padding to $2^{(k+1)}$ or higher is possible, but it is more calculations). After zero padding, the same algorithm as in FIG. 6 is performed, except that N is replaced by N' in all formulas excluding Equation 6. In Equation 6, N is used so that the output signal has a length of N and not N'.

Figure 7:
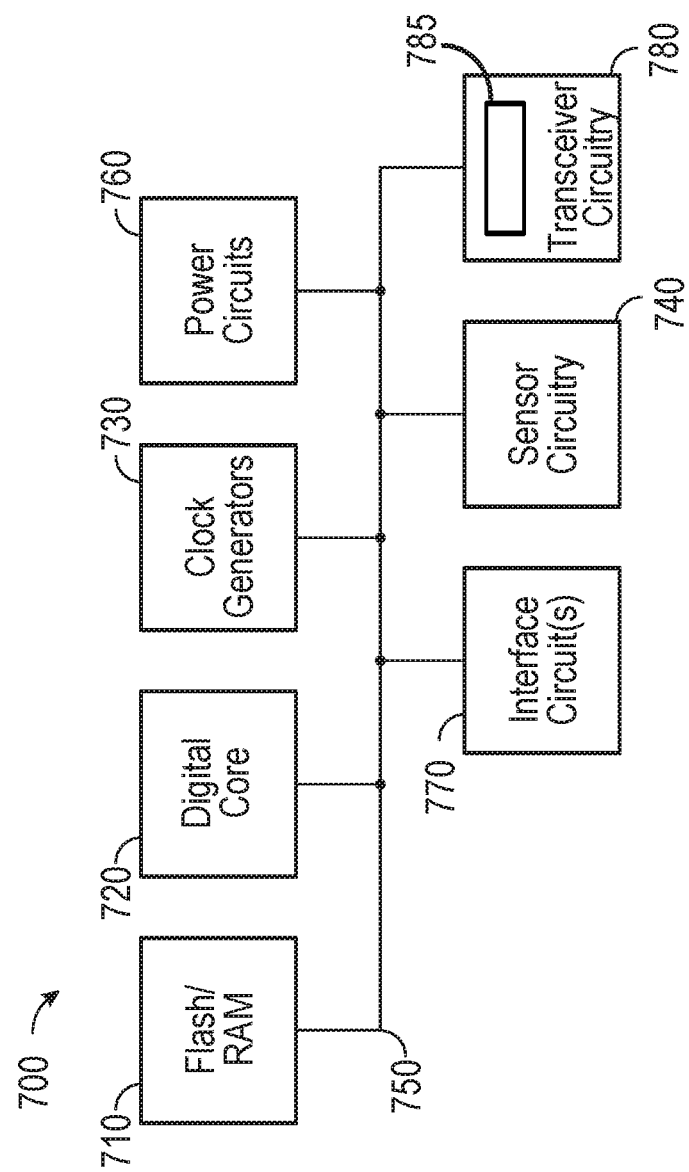
FIG. 7 is a block diagram of a representative wireless device in accordance with an embodiment.

Embodiments may be implemented in many different types of end node devices. Referring now to FIG. 7, shown is a block diagram of a representative device 700 which may be a given wireless device. In the embodiment shown in FIG. 7, device 700 may be a standalone radio, or a radio incorporated into another device such as a sensor, actuator, controller or other device that can be used in a variety of use cases in a wireless control network, including sensing, metering, monitoring, embedded applications, communications applications and so forth.

In the embodiment shown, device 700 includes a memory system 710 which in an embodiment may include a non-volatile memory such as a flash memory and volatile storage, such as RAM. In an embodiment, this non-volatile memory may be implemented as a non-transitory storage medium that can store instructions and data, including code for performing methods including the methods of FIGS. 5 and 6.

Memory system 710 couples via a bus 750 to a digital core 720, which may include one or more cores and/or microcontrollers that act as a main processing unit of the device. As further shown, digital core 720 may couple to clock generators 730 which may provide one or more phase locked loops or other clock generation circuitry to generate various clocks for use by circuitry of the device.

As further illustrated, device 700 further includes power circuitry 770, which may include one or more voltage regulators. Additional circuitry may optionally be present depending on particular implementation to provide various functionality and interaction with external devices. Such circuitry may include interface circuitry 760 which may provide interface with various off-chip devices, sensor circuitry 740 which may include various on-chip sensors including digital and analog sensors to sense desired signals, such as speech inputs, image inputs, environmental inputs or so forth.

In addition as shown in FIG. 7, transceiver circuitry 780 may be provided to enable transmission and receipt of wireless signals, e.g., according to one or more digital radio communication standards such as DAB, DRM or HD™ radio, local area wireless communication schemes, such as a given IEEE 802.11 scheme, wide area wireless communication scheme such as LTE or 7G, among others. And as shown transceiver circuitry 780 includes a tone cancellation circuit 785, which may determine presence of an interfering tone, which if significant enough, is then cancelled as described herein. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a buffer to store orthogonal frequency division multiplexing (OFDM) samples of one or more OFDM symbols;
a fast Fourier transform (FFT) engine coupled to the buffer, the FFT engine to receive the one or more OFDM samples from the buffer and convert the one or more OFDM samples into a plurality of frequency domain carriers; and
a tone cancellation circuit coupled to the FFT engine, the tone cancellation circuit to identify a highest magnitude frequency carrier of the plurality of frequency carriers and remove tone interference from the one or more OFDM samples based at least in part on the highest magnitude frequency carrier.

2. The apparatus of claim 1, wherein the tone cancellation circuit is to replace the highest magnitude frequency carrier with a modified frequency carrier according to $-(P-1)Y(n)$, wherein $P=M+R/N$, wherein P is an oversampling factor, M is a resolution factor, N is a segment length of an OFDM symbol and R is an arbitrary number, and $Y(n)$ is the highest magnitude frequency carrier.

3. The apparatus of claim 2, wherein the tone cancellation circuit is to pad the one or more OFDM samples with $(M-1)N+R$ zeros and generate $M \times N+R$ frequency carriers using the padded OFDM samples.

4. The apparatus of claim 3, wherein the tone cancellation circuit is to identify the highest magnitude frequency carrier from the $M \times N+R$ frequency carriers, remove the tone interference, and transform the $M \times N+R$ frequency carriers to a plurality of tone canceled time domain samples and thereafter remove tail samples of the plurality of tone canceled time domain samples.

5. The apparatus of claim 4, wherein the tone cancellation circuit comprises the FFT engine, and further comprises an inverse FFT (IFFT) engine to transform the $M \times N+R$ frequency carriers to the plurality of tone canceled time domain samples.

6. The apparatus of claim 5, further comprising a second FFT engine to receive the plurality of tone canceled time domain samples and convert the one or more OFDM samples into a second plurality of frequency carriers.

7. The apparatus of claim 6, further comprising a demodulator to demodulate the second plurality of frequency carriers.

8. The apparatus of claim 1, wherein the tone cancellation circuit is to further identify a plurality of neighboring frequency carriers to the highest magnitude frequency carrier.

9. The apparatus of claim 8, wherein the tone cancellation circuit is to generate additional frequency carriers between the highest magnitude frequency carrier and a first neighboring frequency carrier of the plurality of neighboring frequency carriers.

10. The apparatus of claim 9, wherein the tone cancellation circuit is to determine a highest magnitude frequency carrier of the additional frequency carriers.

11. The apparatus of claim 10, wherein the tone cancellation circuit is to cancel the tone interference from the plurality of time domain samples according to: $x(k)=x(k)-ae^{-i2\pi f_m k}$, for $0 \leq k < N$, wherein $x(k)$ is a time domain sample, a is a weighting coefficient and $f_m$ is a frequency of the highest magnitude frequency carrier of the additional frequency carriers.

12. A method comprising:
identifying, in a tone cancellation circuit of a receiver, from a plurality of frequency carriers of an orthogonal frequency division multiplexing (OFDM) symbol, a highest magnitude frequency carrier and first and second neighboring frequency carriers to the highest magnitude frequency carrier;
iteratively calculating, in the tone cancellation circuit, a plurality of intermediate frequency carriers between the highest magnitude frequency carrier and a selected one of the first and second neighboring frequency carriers, and identifying a frequency value of a highest magnitude frequency carrier of the plurality of intermediate frequency carriers; and
cancelling, in the tone cancellation circuit, a tone in the OFDM symbol based at least in part on the frequency value of the highest magnitude frequency carrier of the plurality of intermediate frequency carriers.

13. The method of claim 12, further comprising canceling the tone in the OFDM symbol in the time domain.

14. The method of claim 12, further comprising canceling the tone in the OFDM symbol according to: $x(k)=x(k)-ae^{-i2\pi f_m k}$, for $0 \leq k < N$, wherein $x(k)$ is a time domain sample, a is a weighting coefficient, $f_m$ is the frequency value of the highest magnitude frequency carrier of the plurality of intermediate frequency carriers, and N is a segment length of the OFDM symbol.

15. The method of claim 12, further comprising identifying a higher magnitude frequency carrier of the first and second neighboring frequency carriers and selecting the higher magnitude frequency carrier as the selected one of the first and second neighboring frequency carriers.

16. The method of claim 12, further comprising controlling a timing of one or more OFDM symbols based at least in part on the tone canceled OFDM symbol.

17. The method of claim 16, wherein controlling the timing comprises at least one of controlling a timing of a buffer and adjusting a sampling clock signal used to sample the one or more OFDM symbols.

18. The method of claim 12, further comprising, for a second OFDM symbol:
    identifying a highest magnitude frequency carrier of the second OFDM symbol; and
    in response to determining that the highest magnitude frequency carrier of the second OFDM symbol does not exceed a threshold level, passing the second OFDM symbol without cancelling a tone in the second OFDM symbol.

19. An apparatus comprising:
    means for identifying a highest magnitude frequency carrier and first and second neighboring frequency carriers to the highest magnitude frequency carrier of an orthogonal frequency division multiplexing (OFDM) symbol;
    means for calculating a plurality of intermediate frequency carriers between the highest magnitude frequency carrier and a selected one of the first and second neighboring frequency carriers; and
    means for cancelling a tone in the OFDM symbol based at least in part on a frequency value of a highest magnitude frequency carrier of the plurality of intermediate frequency carriers.

20. The apparatus of claim 19, wherein the means for cancelling is to cancel the tone in the OFDM symbol in the time domain according to: $x(k)=x(k)-ae^{-i2\pi f_m k}$, for $0 \leq k < N$, wherein $x(k)$ is a time domain sample, a is a weighting coefficient, $f_m$ is the frequency value of the highest magnitude frequency carrier of the plurality of intermediate frequency carriers, and N is a segment length of the OFDM symbol.

* * * * *